United States Patent

[11] 3,604,405

[72] Inventor William A. Maher
9 Winters St., Vallejo, Calif. 94590
[21] Appl. No. 824,027
[22] Filed May 7, 1969
[45] Patented Sept. 14, 1971

[54] FUEL INJECTORS
2 Claims, 5 Drawing Figs.

[52] U.S. Cl. .................................................. 123/139 AJ,
123/119, 123/140 MP, 123/143 B
[51] Int. Cl. ........................................................ F02m 49/00
[50] Field of Search............................................ 123/32, 33,
33 B, 33 G, 119, 143, 139.8, 139.9, 139.17

[56] References Cited
UNITED STATES PATENTS

| | | | |
|---|---|---|---|
| 1,314,561 | 9/1919 | Wright | 123/139.9 |
| 1,737,813 | 12/1929 | Tice | 123/33 |
| 2,008,998 | 7/1935 | Tice | 123/33 |
| 2,062,644 | 12/1936 | Ensign | 123/33 |
| 2,157,034 | 5/1939 | Tice | 123/139.17 |
| 3,213,839 | 10/1965 | Gitlin et al. | 123/143 A |
| 3,406,667 | 10/1968 | Evans et al. | 123/119 X |

*Primary Examiner*—Laurence M. Goodridge

ABSTRACT: An apparatus for the delivery of metered charges of pressurized fuel to the cylinders of an internal-combustion engine at timed intervals; by employing the alternating gaseous pressures developed within the combustion chambers of the engine. The pneumatically operated injector pumps, which are conjoined to the individual cylinders of the engine and the primary fuel supply system, replace the conventional mechanical or electrically driven components. Fuel to air ratio is controlled by the variable pressure applied to the diaphragms of the injector pumps and by the calibration of the fuel-flow metering discs of the injector nozzles.

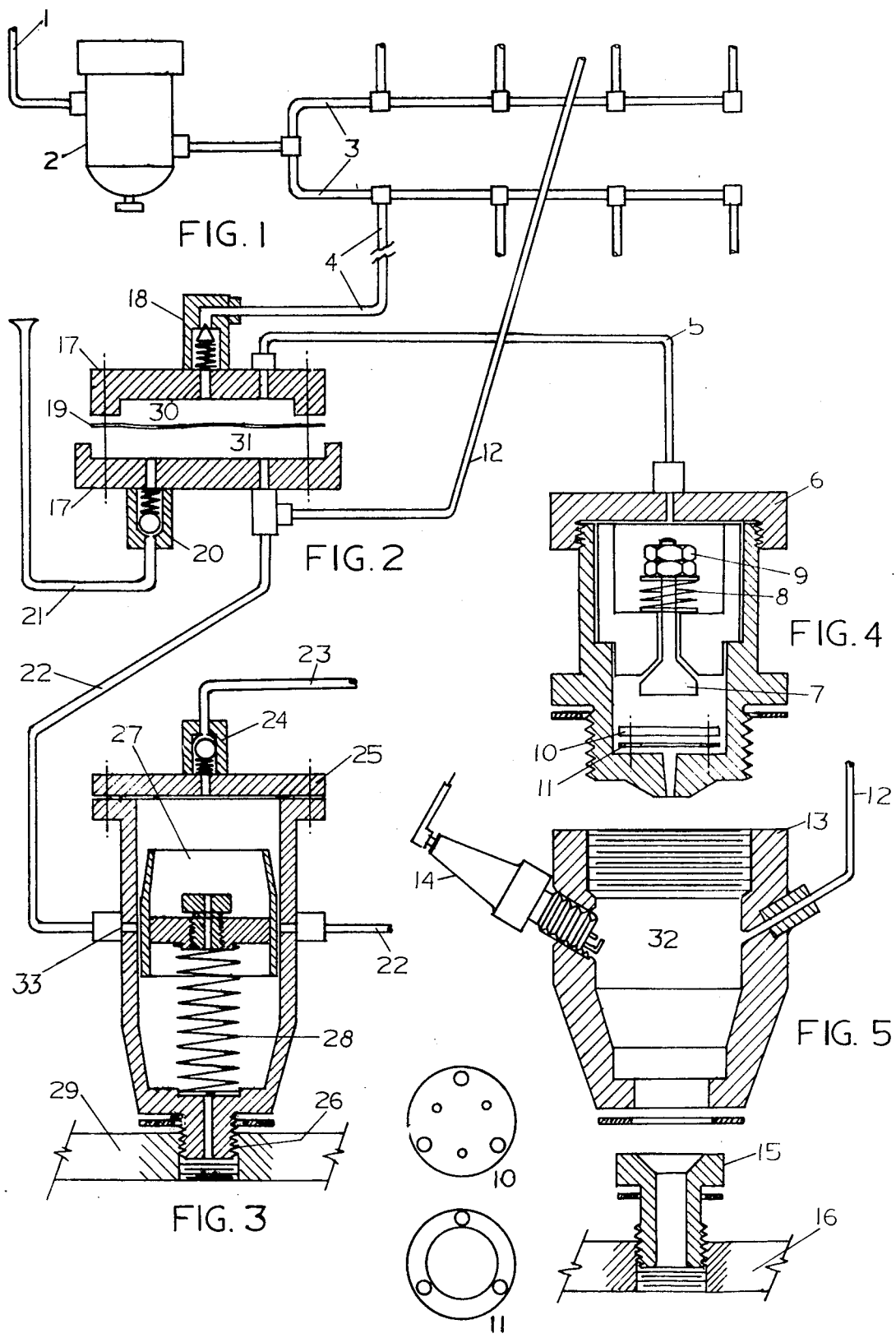

FUEL INJECTORS

This invention relates to a system of fuel injection for internal combustion engines. The primary object of this invention is to supply the automotive market with a superior device that will charge the combustion chamber of a multicylinder internal combustion engine with a fuel structure composed of flammable elements having a controlled fuel-air ratio compatible with efficient combustion of the fuel within the combustion chamber; thereby eliminating the products of incomplete combustion within the exhaust emissions which are inevitable with engines equipped with a carburetor, and which are the basic ingredients of automotive air pollution.

Another object of the invention is to provide a system of charging the combustion chamber of the engine cylinder with a dual fuel-to-air ratio, forming a compound fuel structure with a metered and timed injection of fuel directed toward the central area of the combustion chamber, with the periphery of the primary charge surrounded by a blanket of air, or a lean mixture of fuel and air, to contain the excess of oxygen essential for the efficient combustion of the fuel.

A further object of the invention is to produce a system of injecting fuel into the combustion chamber in an atomized state, in which it will be more readily assimilated with the air and become less prone to detonate during combustion.

Another object of the invention is to provide a fuel-injection system that introduces the fuel charge to each individual cylinder following the closing of the exhaust valve, assuring the containment of the full charge of fuel during the precombustion cycle of the engine.

Another object of the invention is to provide a fuel-feeding system for internal-combustion engines to employ the alcohols and other quality fuels of low volatility, which present many advantages as a potential fuel, but cannot be employed satisfactorily with the conventional carburetor.

Another object of the invention is to reference a superior fuel-injector system at a practical price that will remove the economic barrier which has delayed the public acceptance of the intricate and complex systems, some of which are much more efficient than the conventional carburetor, but cannot be manufactured at a comparable cost.

With these and other objects in view reference now had to the accompanying drawing in which, FIG. 1 is a diagram of the primary low-pressure section of the combination.

FIG. 2 is an exploded view of the novel pneumatically operated fuel-injector pump, shown with attached plumbing.

FIG. 3 is a sectional view of the auxiliary vacuum-actuated, fuel-control component.

FIG. 4 is a sectional view of the fuel-discharge nozzle, with an adjustable fuel-flow metering disc.

FIG. 5 is a sectional view of an adapter designed to facilitate the installation of the fuel-injection system on internal-combustion engines presently equipped with a carburetor.

Having reference to the drawing, like numerals refer to like parts throughout the description of the system.

Shown in FIG. 1, the fuel transfer pump 2 of conventional design and which may be mechanically or electrically operated, or the system may employ a combination of a mechanical and electrical fuel transfer pump 2 operating in tandem, with a capacity to supply an adequate amount of fuel with sufficient pressure to replenish the supply contained within the fuel chamber 30 during the interval that the pump diaphragm 19 is exposed to the vacuum developed by the downward travel of the piston of the coordinating cylinder of the engine, not shown. With further reference to FIG. 1, a short section of the primary fuel line 1 is shown attached to the intake side of the fuel transfer pump 2. The opposite end of this primary fuel line, which normally is connected to the fuel supply tank, is not shown. The fuel discharge port of the fuel transfer pump 2 is attached to the fuel distribution harness 3.

The most unique and novel component of the invention is shown in an exploded form in FIG. 2. The fuel chamber 30 of the injector pump 17 is shown connected to a branch 4 of the primary fuel supply system, through the check valve 18 that prevents a reverse flow of flue during the interval that pneumatic pressure is applied to the diaphragm 19. One end of the tube 12 which maintains a means of pneumatic communication between the pressure chamber 31 of the injector pump 17 and the combustion chamber of a selected preceding cylinder of the sequence of the engine's firing order, is shown attached to the Tee fitting of the pressure chamber 31 which is also connected to a tube 22 for pneumatic communication between the individual injector pump of each cylinder with the auxiliary fuel control unit 25. The short tube 21 provides a means of a timed ingress of air from the atmosphere through the check valve 20 into the pneumatic chamber of the pump.

In selecting the coordinating preceding cylinder of the engine's firing order for the most efficient timing of the paired cylinders, a determination must be made that involves several relative factors, such as the number of cylinders of the engine, the valve opening duration, the period of overlap of the exhaust and intake valve, and the location of the fuel discharge nozzle.

To paraphrase a reference to the injector pump 17 shown in FIG. 2, it could be described as an inexpensive component having one moving part which is employed as a means of harnessing an available source of pneumatic energy, and which will establish a breakthrough in the art of pressurized fuel injection, in that it will match the efficiency of the most expensive injector systems for a fraction of the manufacturing cost.

The primary function of the auxiliary control unit 25 shown in FIG. 3 is to reduce the pressure applied to the diaphragm 19 and to the fuel during periods of rapid deceleration of the engine or when the power output of the engine is restricted by the position of the air-intake throttle of the engine, not shown.

The detailed description of the auxiliary control unit 25 shows a sleeve 26 fitted to the wall of the intake manifold 29. The sleeve 26 is bored to provide a controlled vacuum communication with the piston 27 which is activated when the vacuum within the manifold is sufficient to overcome the resistance of the calibrated spring 28. It should be observed that the lower area of the outside diameter of the control piston 27 is straight and fitted to seal the pressure escape orifices 33 of the cylinder wall when the speed of the engine is not restricted by the engine throttle.

The upper end of the outside diameter of the control piston 27 is tapered and is ground to permit a controlled escape of pressure when less fuel is required to balance the reduced power output of the engine. At the top of the control unit 25 is a means for connecting a tube 23 to the crankcase of the engine not shown through the check valve 24.

With further reference to the drawing, FIG. 4 is a sectional view of the fuel discharge nozzle 6 showing a conventional-type nozzle check valve 7 with a spring 8 which can be adjusted by nuts 9. Also shown as an integral part of the nozzle 6 is the fuel-metering disc 10 which can be calibrated by shims 11. The tube 5 for the transfer of pressurized fuel is shown connecting the nozzle 6 with the fuel chamber 30 of the pneumatic pump.

The adapter 13 shown in FIG. 5 provides a means for installing the pneumatic fuel injector system without modifying or remachining the cylinder head of the engine. The outer diameter of the connecting sleeve 15 is shown with threads to complement the threads of the wall of the combustion chamber 16. The spark plug 14 is relocated to an area of junction 32 with the fuel from the nozzle 6 and the gases from the combustion chamber not shown conveyed through the bore of the connecting sleeve 15.

Having thus described my invention, I claim:

1. A system for injecting fuel to each cylinder of a multicylinder engine having at least two cylinders comprising a fuel supply, a fuel manifold having at least two branches, pump means for delivering fuel from said fuel supply to said manifold at a rate depending on the rate of fuel consumption by the engine, injector pump means including a hollow fluidtight casing, a movable wall in said hollow casing forming two fluidtight chambers, a fuel inlet and a fuel outlet for one of said chambers, a gas inlet for the other of said chambers, a connection between said fuel inlet and one of said branches, an adapter of tubular form secured in a port opening into each cylinder, an injection nozzle secured in each of said adapters, a fuel metering restriction at the outlet of each said nozzle, a check valve at the fuel inlet of each said nozzle, a fluid connection between said fuel outlet from said chamber of each said injector pump means and said fuel inlet of each said nozzle, means to force fuel through the said metering restriction of each said nozzle in timed relation with the charging stroke of each cylinder including a conduit connecting a said gas inlet of each said injector pump means for each cylinder with a said adapter of a first cylinder preceding in sequence according to firing order so as to pressurize said chambers of an injector pump means for second cylinder following in timed sequence according to firing order during the power stroke of said first cylinder and force fuel through the said nozzle of said second cylinder, and means to modify the degree of pressurization in said chambers during injection as a function of engine load, means including a gas outlet port, one for each cylinder, means operated by intake manifold suction for restricting each said port to a lesser degree as suction increases and a greater degree as suction decreases, and a connection between each said port and each said conduit.

2. The combination of components as formulated in claim 1 and including a positive means for controlling the temperature of the fuel contained within the fuel chambers of the injector pumps by the medium of a synchronous ingress of air from the atmosphere through the one-way flow check valves attached to the pressure chambers of the injector pumps, said ingress of cooling air from the atmosphere is automatically timed by the cycles of the preceding and connecting cylinder to precede and insulate the pressure chambers of the injector pumps from the heat of the pressurized gases.